US010623718B2

(12) United States Patent
Cabral et al.

(10) Patent No.: US 10,623,718 B2
(45) Date of Patent: *Apr. 14, 2020

(54) CAMERA CALIBRATION SYSTEM

(71) Applicant: Facebook, Inc., Menlo Park, CA (US)

(72) Inventors: Brian Keith Cabral, San Jose, CA (US); Albert Parra Pozo, San Mateo, CA (US); Forrest Samuel Briggs, Palo Alto, CA (US); Joyce Hsu, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/205,109

(22) Filed: Nov. 29, 2018

(65) Prior Publication Data

US 2019/0098287 A1 Mar. 28, 2019

Related U.S. Application Data

(63) Continuation of application No. 15/096,149, filed on Apr. 11, 2016, now Pat. No. 10,187,629.

(Continued)

(51) Int. Cl.
*H04N 13/332* (2018.01)
*H04N 13/243* (2018.01)
(Continued)

(52) U.S. Cl.
CPC ........... *H04N 13/246* (2018.05); *G06T 7/85* (2017.01); *H04N 5/247* (2013.01);
(Continued)

(58) Field of Classification Search
CPC ................................ H04N 13/246; G06T 7/85
See application file for complete search history.

(56) References Cited

U.S. PATENT DOCUMENTS 9,560,345 B2 * 1/2017 Grundhofer .............. G06T 7/80
9,934,615 B2    4/2018 Cabral et al.
(Continued)

FOREIGN PATENT DOCUMENTS

EP      2 530 647 A1   12/2012
WO  WO 2015/110847 A1   7/2015
WO  WO 2015/191204 A1  12/2015

OTHER PUBLICATIONS

European Patent Office, Search Report and Opinion, European Patent Application No. 17164949.4, dated Aug. 2, 2017, eight pages.

(Continued)

*Primary Examiner* — Irfan Habib
(74) *Attorney, Agent, or Firm* — Fenwick & West LLP

(57) ABSTRACT

A camera calibration system jointly calibrates multiple cameras in a camera rig system. The camera calibration system obtains configuration information about the multiple cameras in the camera rig system, such as position and orientation for each camera relative to other cameras. The camera calibration system estimates calibration parameters (e.g., rotation and translation) for the multiple cameras based on the obtained configuration information. The camera calibration system receives 2D images of a test object captured by the multiple cameras and obtains known information about the test object such as location, size, texture and detailed information of visually distinguishable points of the test object. The camera calibration system then generates a 3D model of the test object based on the received 2D images and the estimated calibration parameters. The generated 3D model is evaluated in comparison with the actual test object to determine a calibration error. The calibration parameters for the cameras are updated to reduce the calibration error for the multiple cameras.

16 Claims, 8 Drawing Sheets

Related U.S. Application Data

(60) Provisional application No. 62/319,032, filed on Apr. 6, 2016.

(51) Int. Cl.
*H04N 13/246* (2018.01)
*H04N 5/247* (2006.01)
*G06T 7/80* (2017.01)
*H04N 17/00* (2006.01)

(52) U.S. Cl.
CPC ......... *H04N 13/243* (2018.05); *H04N 13/332* (2018.05); *H04N 17/002* (2013.01)

(56) References Cited

U.S. PATENT DOCUMENTS

| | | | |
|---|---|---|---|
| 10,057,562 | B2 | 8/2018 | Cabral et al. |
| D830,444 | S | 10/2018 | Cabral et al. |
| D830,445 | S | 10/2018 | Cabral et al. |
| 2002/0024516 | A1 | 2/2002 | Chen et al. |
| 2009/0051624 | A1* | 2/2009 | Finney ................ H05B 37/029 345/30 |
| 2010/0076306 | A1* | 3/2010 | Daigneault ............ A61B 46/10 600/426 |
| 2010/0085425 | A1* | 4/2010 | Tan ...................... H04N 9/3194 348/54 |
| 2011/0025845 | A1 | 2/2011 | Han et al. |
| 2011/0211046 | A1* | 9/2011 | Stumber ................ G01C 11/00 348/47 |
| 2012/0147004 | A1 | 6/2012 | Choi et al. |
| 2013/0120562 | A1 | 5/2013 | Chang et al. |
| 2014/0104378 | A1 | 4/2014 | Kauff et al. |
| 2014/0153916 | A1 | 6/2014 | Kintner |
| 2015/0193920 | A1* | 7/2015 | Knee ..................... H04N 5/243 382/154 |
| 2015/0341617 | A1 | 11/2015 | Cole et al. |
| 2015/0341618 | A1* | 11/2015 | He ....................... H04N 17/002 348/47 |
| 2015/0346471 | A1* | 12/2015 | Schwarz ............. H04N 13/246 348/80 |
| 2015/0350542 | A1 | 12/2015 | Steuart |
| 2016/0037030 | A1 | 2/2016 | Weissig et al. |
| 2016/0191815 | A1 | 6/2016 | Annau et al. |
| 2016/0212409 | A1 | 7/2016 | Cole et al. |
| 2017/0069097 | A1* | 3/2017 | Molgaard .......... H04N 5/23238 |
| 2017/0163967 | A1* | 6/2017 | Maier ................... G01C 25/00 |

OTHER PUBLICATIONS

Mikulastik, P., "Verbesserung der Genauigkeit der Selbstkalibrierund einer Stereokamera mit 3D-CAD-Modellen," Dissertation, Hannover University, Nov. 7, 2008, Hannover, Germany, one-hundred seven pages [with English abstract].

PCT International Search Report and Written Opinion, PCT Application No. PCT/US2017/024309, dated Jul. 7, 2017, fifteen pages.

Uematsu, Y. et al., "D-Calib: Calibration Software for Multiple Cameras System," 14th International Conference on Image Analysis and Processing (ICIAP 2007), IEEE, Sep. 10-13, 2007, Modena, Italy, six pages.

\* cited by examiner

400

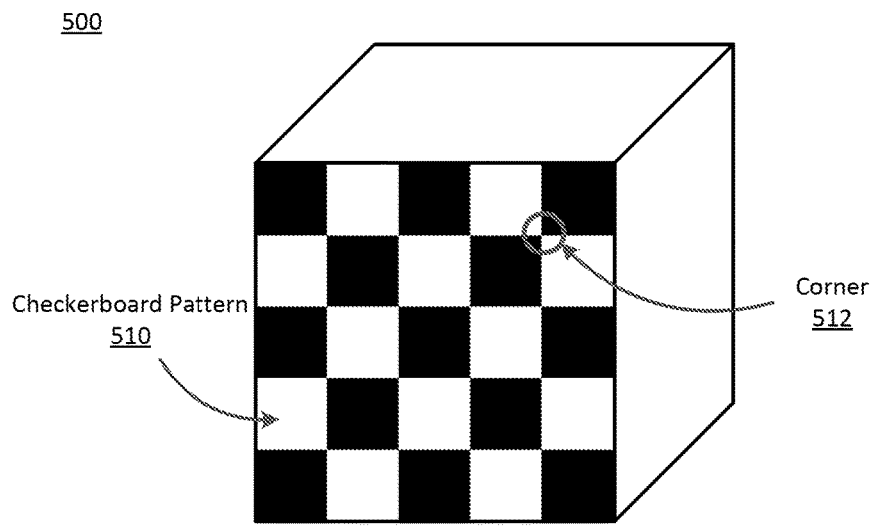
FIG. 5
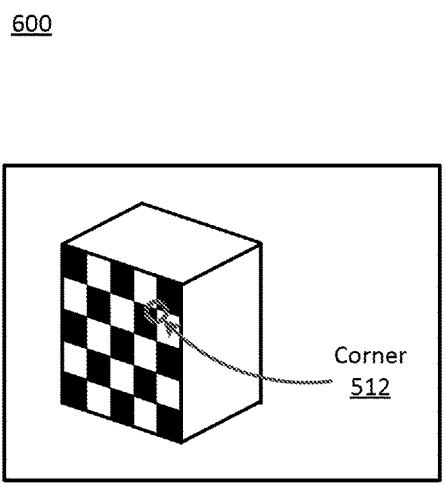 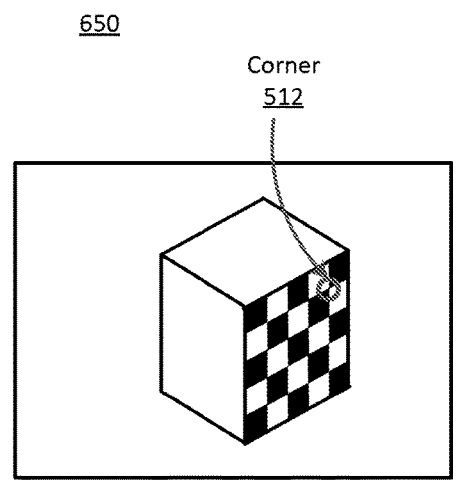
FIG. 6A          FIG. 6B

CAMERA CALIBRATION SYSTEM

CROSS-REFERENCE TO RELATED APPLICATIONS

This application is a continuation of U.S. application Ser. No. 15/096,149, filed Apr. 11, 2016, which claims the benefit of U.S. Provisional Application No. 62/319,032, titled "Camera Calibration System" and filed Apr. 6, 2016, which is incorporated by reference in its entirety.

BACKGROUND

This disclosure relates generally to a multi-camera system, and more specifically to calibrating cameras in the multi-camera system.

Capturing images via a multi-camera system is essential for a Virtual Reality (VR) system to render 3-dimensional (3D) images or videos to users wearing head-mounted displays (HMD). However, tolerances in design and manufacturing of a multi-camera system may cause actual cameras not to be positioned in correct places or with correct angles as designed. Cameras may be laterally or vertically translated relative to one another, or imperfectly oriented relative to one another. These imperfections may cause serious problems in the images generated by the multi-camera system, for example, serious distortion or double vision, which degrades user experience.

Thus, there is a need for calibrating a multi-camera system to render accurate images.

SUMMARY

A camera calibration system jointly calibrates multiple cameras in a camera rig system by modeling objects seen by the cameras and comparing the objects to known surroundings of the camera rig system.

The multiple cameras in the camera rig system may not be positioned or oriented as required for the intended design purpose, in which case the actual position of the cameras and their relative rotation compared with the design is unknown. This problem may cause visual artifacts when combining images captured by the multiple cameras, for example to generate a view between two cameras. The camera calibration system executes extrinsic calibration to calibrate the multiple cameras in the camera rig system. Extrinsic calibration refers to the calibration of rotation and translation between cameras in the camera rig system, as distinguished from color, exposure, and other configurations that may differ between the cameras.

The camera calibration system may execute one round or multiple rounds of calibration for the camera rig system. During a round of calibration, the multiple cameras capture images of a set of test objects positioned in a designated place from different perspective views provided by the multiple cameras. The captured images are received by the camera calibration system as well as the detailed information about the set of test objects, such as location, size, shape, color and texture of the test objects. The camera calibration system also obtains configuration information about the multiple cameras that capture images of the test objects. The configuration information includes metrics of the position and orientation of each camera relative to other cameras among the multiple cameras. The configuration information is then used to estimate initial calibration parameters, such as rotation and translation, for the multiple cameras. The camera calibration system creates, for example, a 3D model of one specific test object by calculating measures of the 3D model based on the received 2D images captured by the multiple cameras and on the estimated calibration parameters about the multiple cameras.

The camera calibration system evaluates the created 3D model in comparison with the known information of the specific test object. A calibration error indicates how well the created 3D model resembles the actual test object, for example, how well the created 3D model matches the known test object in terms of various calibration measures such as location, size, shape, texture and detailed information of visually distinguishable points on the surface of the test object. In some embodiments, the calibration measures also depend on the properties of test objects. For example, for a test object that is a six-faced cube, perpendicularity among different faces and flatness of each face are two calibration measures for this test object. The calibration error thus indicates how well the calibration parameters of the multiple cameras are estimated by comparing the calculated calibration measures of the 3D model against the calibration measures of the known object. For example, a 3D model that does not match the actual test object may indicate that the estimated calibration parameters of the multiple cameras are not accurate and the calibration based on the estimated parameters is not effective, and the calibration parameters may be adjusted in the next round of extrinsic calibration.

In one embodiment, only two cameras in the camera rig system are jointly calibrated at one time for one round of calibration using the approach described above. Each adjacent pair of cameras may then be jointly calibrated until all groups of cameras have been calibrated for a given calibration iteration. In another embodiment, a different number of cameras or all the cameras in the camera rig system may be jointly calibrated at one time using the approach described above. The calibration may be iteratively performed until the calibration error does not continue to improve (i.e., the final calibration error is similar between iterations).

In one embodiment, the camera rig system is placed in a known environment having two or more known objects in view of each camera in the camera rig system. In this example, each of the known objects may also be viewed by two or more cameras. In this way, the calibration of each camera can be linked to the calibration of other nearby cameras via the joint view of the same object.

To calibrate the cameras, the camera calibration system may use a gradient descent function for the calibration parameters of the cameras. The gradient descent function minimizes calibration error of the difference in the measures between the modeled 3D object and the known test object by adjusting the calibration parameters in the gradient that reduces the calibration error. Since the cameras can be optimized using the known objects, this calibration technique permits a faster and more reliable calibration over prior methods.

BRIEF DESCRIPTION OF THE DRAWINGS

FIG. 5 shows an example test object for extrinsic calibration of multiple cameras in the camera rig system, according to one embodiment.

FIG. 6A and FIG. 6B show two images of the test object captured by two different peripheral cameras in the camera rig system, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
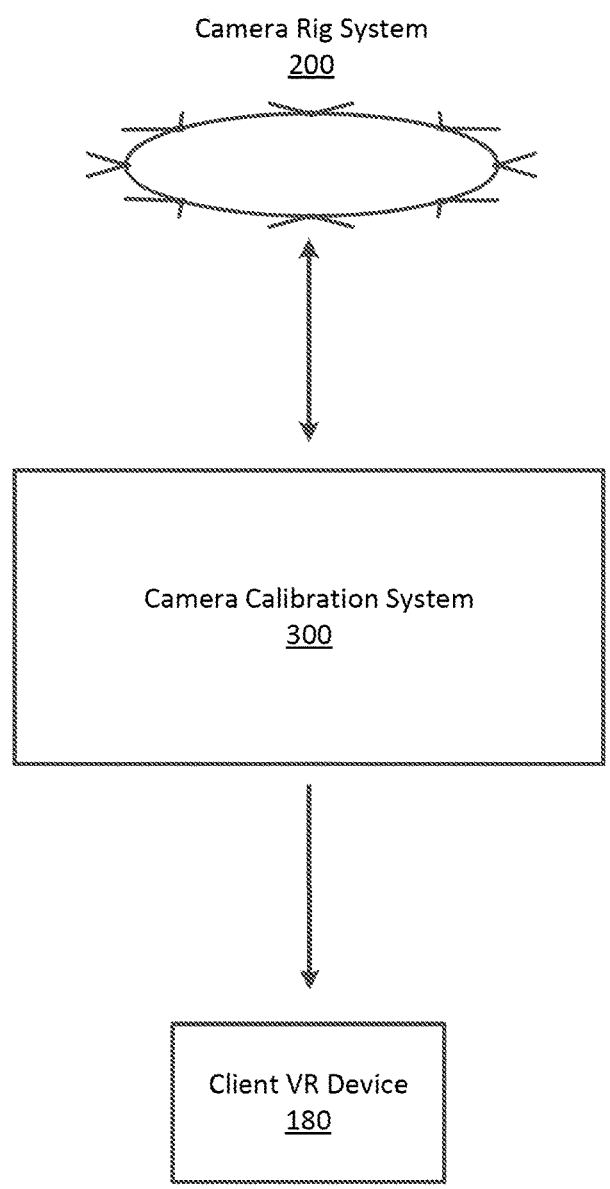
FIG. 1 is a block diagram of a system environment in which a camera calibration system operates, according to one embodiment

FIG. 1 is a block diagram of a system environment 100 in which a camera calibration system 300 operates, according to one embodiment. The system environment 100 shown in FIG. 1 includes a camera rig system 200, a camera calibration system 300, and a client VR device 180. Only one camera rig system 200, one camera calibration system 300 and one client VR device 180 are shown in FIG. 1 for purpose of illustration. In alternative embodiments not shown, the system environment 100 can include multiple camera rig systems 200, camera calibration systems 300, client VR devices 180, and different and/or additional components. Likewise, the functions performed by various entities in the system environment 100 may differ in different embodiments.

The camera rig system 200 is a multi-camera system that is designed to capture images and/or videos of a local area. The local area is the environment that surrounds the camera rig system 200. For example, the local area may be a room where the camera rig system 200 is positioned inside. The images captured by the camera rig system 200 provide multiple views of a scene or an object and may be used to create a canvas view of the scene for a client VR device 180. A canvas view can be any panoramic, spherical panoramic, or suitable wide angle view of a scene generated by combining multiple views from multiple cameras in the camera rig system 200. The canvas view may simulate for a user who wears a client VR device 180 the experience of standing at the origin point of the camera rig system 200. As more fully described below in FIG. 2A-2B, the camera rig system 200 includes multiple peripheral cameras 230, a top axis camera 240 and a bottom axis camera. In some embodiments, the images captured by the cameras included in the camera rig system 200 and related image data are output to a camera calibration system 300 for calibrating the set of multiple cameras. As one example, the camera rig system 200 captures images of a known test object for the camera calibration system 300 to jointly calibrate the set of multiple cameras in the camera rig system.

The camera calibration system 300 receives the captured images from the camera rig system 200 and executes a software-based camera calibration for the set of multiple cameras in the camera rig system. The camera rig system 200 may contain different kinds of distortions that need extrinsic calibration. For example, the set of multiple cameras in the camera rig system 200 may be oriented with some unknown discrepancy from the intended manufacturing configuration, and the relative positions and orientations among different cameras may be slightly different from the ideal design. The camera calibration system 300 jointly calibrates the set of multiple cameras in the camera rig system 200 and performs a software-based calibration for calibration parameters to adjust the images from each camera to account for the discrepancies.

As more fully described below, the camera calibration system 300 processes images of a known test object captured by the camera rig system 200 and identifies initial calibration parameters (e.g., rotation and translation) for calibration of the cameras in the camera rig system. More specifically, a 3D model of the test object is generated by the camera calibration system 300 and compared with known data of the actual test object to evaluate the calibration parameters and adjust the parameters for more precise calibration. The calibration via the camera calibration system 300 provides more accurate information about the camera rig system 200, such as the positions and orientations of each camera relative to one another. The calibration parameters may be used to improve the accuracy of the captured images from each individual camera and to improve subsequent processing, for example to generate content for the client VR device 180.

The client VR device 180 is a head-mounted display that presents media to a user. More specifically, the client VR device 180 receives images or video provided by the camera rig system 200 and provides virtual scenes to the user wearing the client VR device. For example, the client VR device 180 provides the user with a stereoscopic 3D virtual scene from views created with captured images from the camera rig system 200.

Figure 2A:
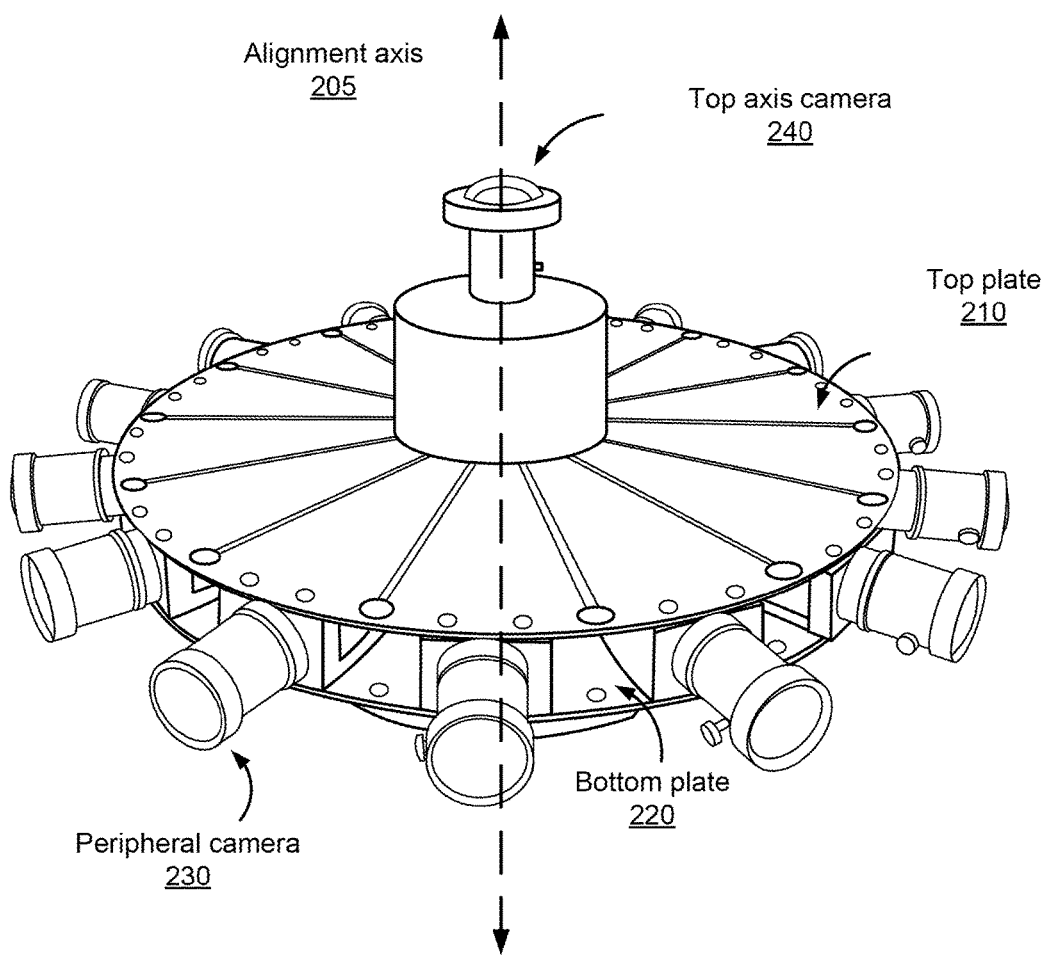
FIG. 2A is a perspective view of the camera rig system, according to one embodiment.
Figure 2B:
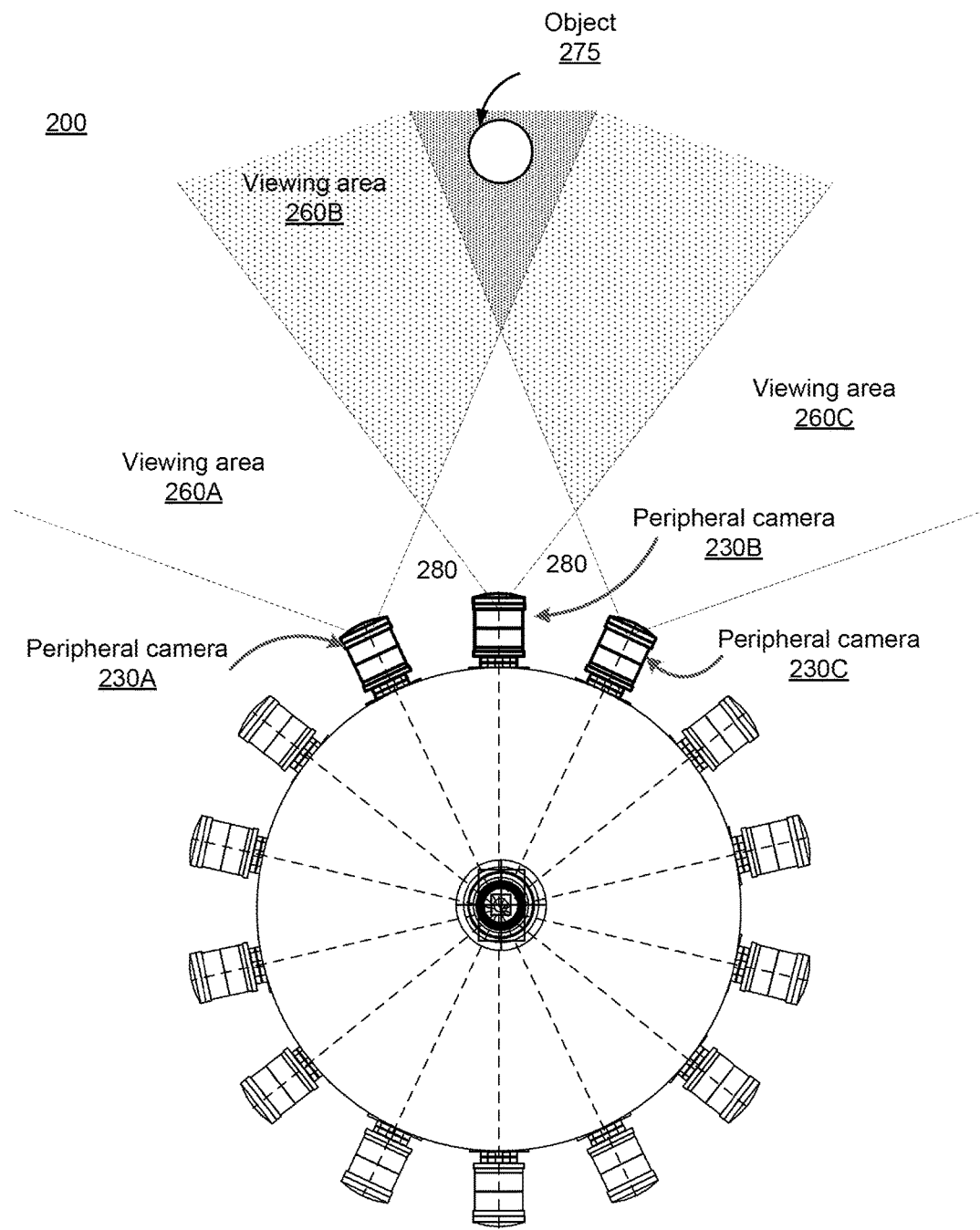
FIG. 2B is a top view of the camera rig system shown in FIG. 2A, according to one embodiment.
Figure 2C:
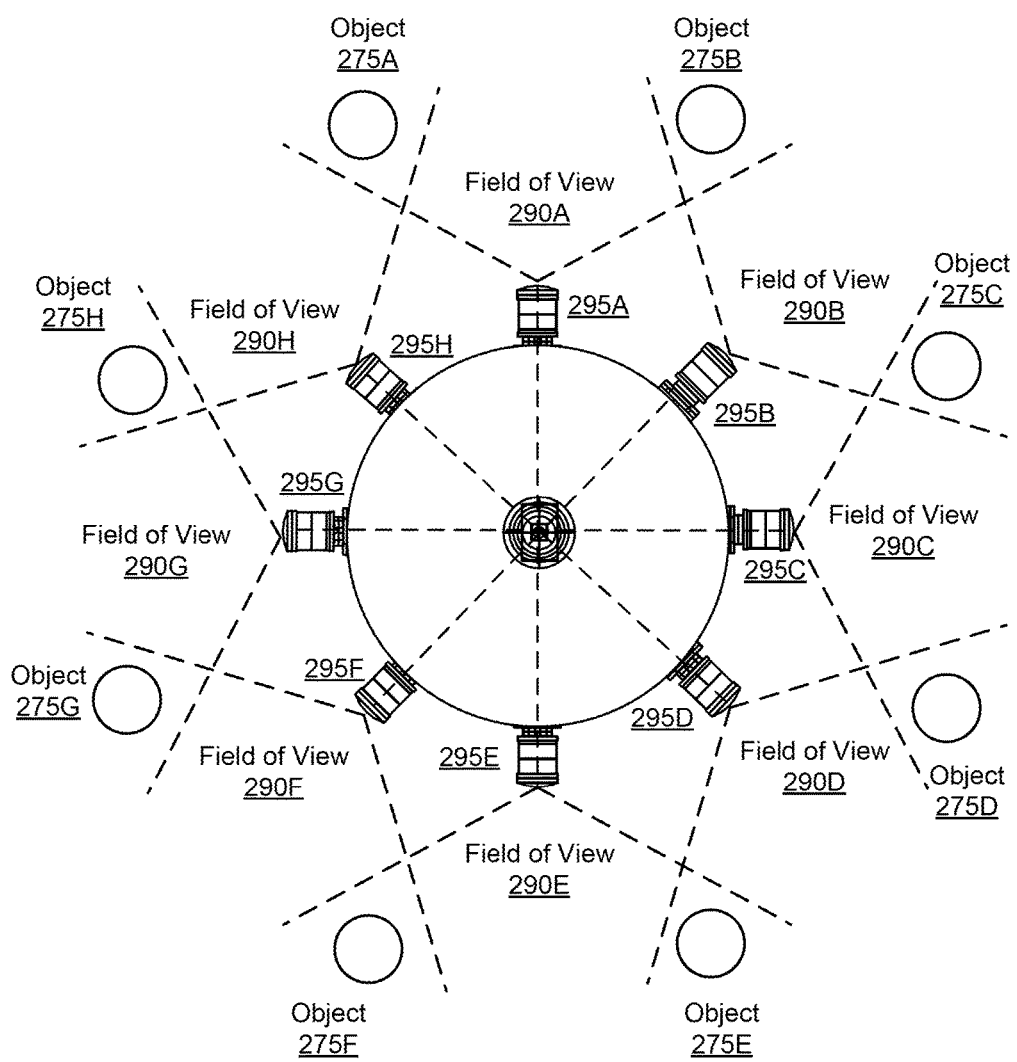
FIG. 2C is a top view of a camera rig system during calibration, according to one embodiment.

FIG. 2A-2C show different views of the camera rig system 200, according to one embodiment. In particular, FIG. 2A is a perspective view of the camera rig system 200, according to one embodiment. As shown in FIG. 2A, the camera rig system 200 includes an alignment axis 205, a top plate 210, a bottom plate 220, multiple peripheral cameras 230 and multiple axis cameras 240. The multiple peripheral cameras 230 are arranged such that they form a ring around a central point that is bisected by the alignment axis 205. The top plate 210 couples to a top surface of the ring of the peripheral cameras 230 and the bottom plate 220 couples to a bottom surface of the ring of the peripheral cameras 230. The axis cameras 240 are aligned along the alignment axis 205 and are capable of capturing a top view and a bottom view of a local area or a scene. This configuration creates a rigid structure that prevents vibration of the peripheral cameras 230 and allows the peripheral cameras to capture quality images and/or video that are used to generate 360 degree images/video for a VR system, which further allows the peripheral cameras and the axis cameras together to generate a canvas view for the VR system. In more detail, the canvas view of a scene is generated by combining the top view captured by the top axis camera 240, the bottom view captured by the bottom axis camera (not shown here), and side views captured by the multiple peripheral cameras 230.

In FIG. 2A, fourteen peripheral cameras 230 and two axis cameras including a top axis camera 240 and a bottom axis camera (not shown here) are shown for purposes of illustration. In alternative embodiments not shown, a different number of peripheral cameras 230 and/or axis cameras 240 may be included in the camera rig system 200. Likewise, additional and/or different components may be included in the camera rig system 200. Additionally, functions performed by the various entities shown in FIG. 2A may differ in different embodiments.

In more detail, the peripheral cameras 230 are designed to capture images and/or video of a 360 degree view of a local area or a scene. As described above, the multiple peripheral cameras 230 are positioned such that they form a ring around a central point that is bisected by the alignment axis 205. The multiple peripheral cameras 230 are also positioned around the central point such that an optical axis of each peripheral camera is within a plane, and a field of view of each peripheral camera faces away from the central point. As shown in FIG. 2A, each peripheral camera 230 is also positioned next to an adjacent peripheral camera at a certain distance and at a certain angle. However, due to manufacturing and construction tolerances, each camera may actually be translated or rotated relative to the original design. The calibration parameters for each camera may be used to account for and correct this translation and rotation.

The axis cameras 240 are designed to capture images and/or videos of top and bottom views of the local area or a scene. Each axis camera 240 is aligned along the alignment axis 205 and oriented such that the optical axis of each axis camera is collinear with the alignment axis. The field of view of each axis camera 240 is directed away from the central point of the camera rig system 200. As shown in FIG. 2A, a top axis camera 240 captures a top view of the local area or the local scene. A bottom axis camera (not shown) is positioned symmetrically with the top axis camera 240 along the alignment axis 205 to capture a bottom view of the local area. The top and bottom axis cameras 240 are vertically offset relative to the peripheral cameras 230 to limit the overlap between the fields of view. As one example, the top axis camera 240 and the bottom axis camera may include a fish-eye lens to capture a wide field of view.

FIG. 2B is a top view of the camera rig system 200 shown in FIG. 2A, according to one embodiment. The configuration shown in FIG. 2B may be used for calibration of the camera rig system 200, particularly with respect to peripheral cameras 230A, 230B, and 230C. In FIG. 2B, an object 275 is shown and the peripheral cameras 230A, 230B and 230C and their corresponding viewing areas 260A, 260B and 260C are highlighted for purpose of illustration. Each viewing area 260 illustrates the field of view of a corresponding peripheral camera 230. For example, the viewing area 260A shows the field of view of the peripheral camera 230A, the viewing area 260B shows the field of view of the peripheral camera 260B, and the viewing area 260C shows the field of view of peripheral camera 260C.

As described below, each peripheral camera 230 is positioned and oriented at a certain distance and at a certain angle next to an adjacent peripheral camera such that each two adjacent peripheral cameras have a certain overlap of their field of views. The overlapping parts of the field of views are represented by the shadow regions in FIG. 2B. In some embodiments, the multiple peripheral cameras 230 are positioned and oriented such that any object in the local area at a certain distance from the central point can be seen by at least two peripheral cameras. In the example shown in FIG. 2A, the regions between the viewing areas 260A, 260B and 260C are blind spot regions 280 in which an object cannot be viewed by any peripheral camera 230 and the shadow regions can be seen by at least two peripheral cameras. The object 275 in FIG. 2B can be viewed by the three peripheral cameras 230A, 230B and 230C. The field of views may vary according to different types of the peripheral cameras 230, and the overlapping regions for the field of views of different cameras may also vary according to numbers, positions and orientations of the multiple peripheral cameras.

Object 275 is an object with known characteristics, such as its shape, any markings on the object, and other features that may be viewed by the peripheral cameras 230. As discussed further below, the different views of object 275 may be used to calibrate the peripheral cameras 230. Using the known features of the object 275, the known features are compared with features determined via the different views to evaluate calibration parameters identified for each peripheral camera 230. In this example, the calibration parameters may be identified for peripheral cameras 230A, 230B, and 230C.

FIG. 2C is a top view of a camera rig system 270 during calibration, according to one embodiment. The camera rig system 270 shares similar properties of the camera rig system 200 shown in FIG. 2A-2B but has a different number of peripheral cameras 295. In more detail, the camera rig system 270 shown in FIG. 2C has 8 peripheral cameras 295 instead of 14 peripheral cameras 230 as shown in FIG. 2A-2B. As shown in this example, eight cameras 295A-295H each have corresponding fields of view 290A-H. Adjacent cameras, such as cameras 295A and 295B, have overlapping fields of view in which known objects 275A-275H are located. In this way, each object is seen by at least two cameras, and each camera includes at least two objects in its field of view. This permits each camera to be jointly calibrated with one another, either as sequential pairs (e.g., 295A-295B, then 295B-295C) or jointly for the full set of cameras. Thus, each object 275 links the calibration of each camera 295 to the calibration of the other cameras 295 that view the object, such that the camera rig system as a whole may be jointly calibrated.

Figure 3:
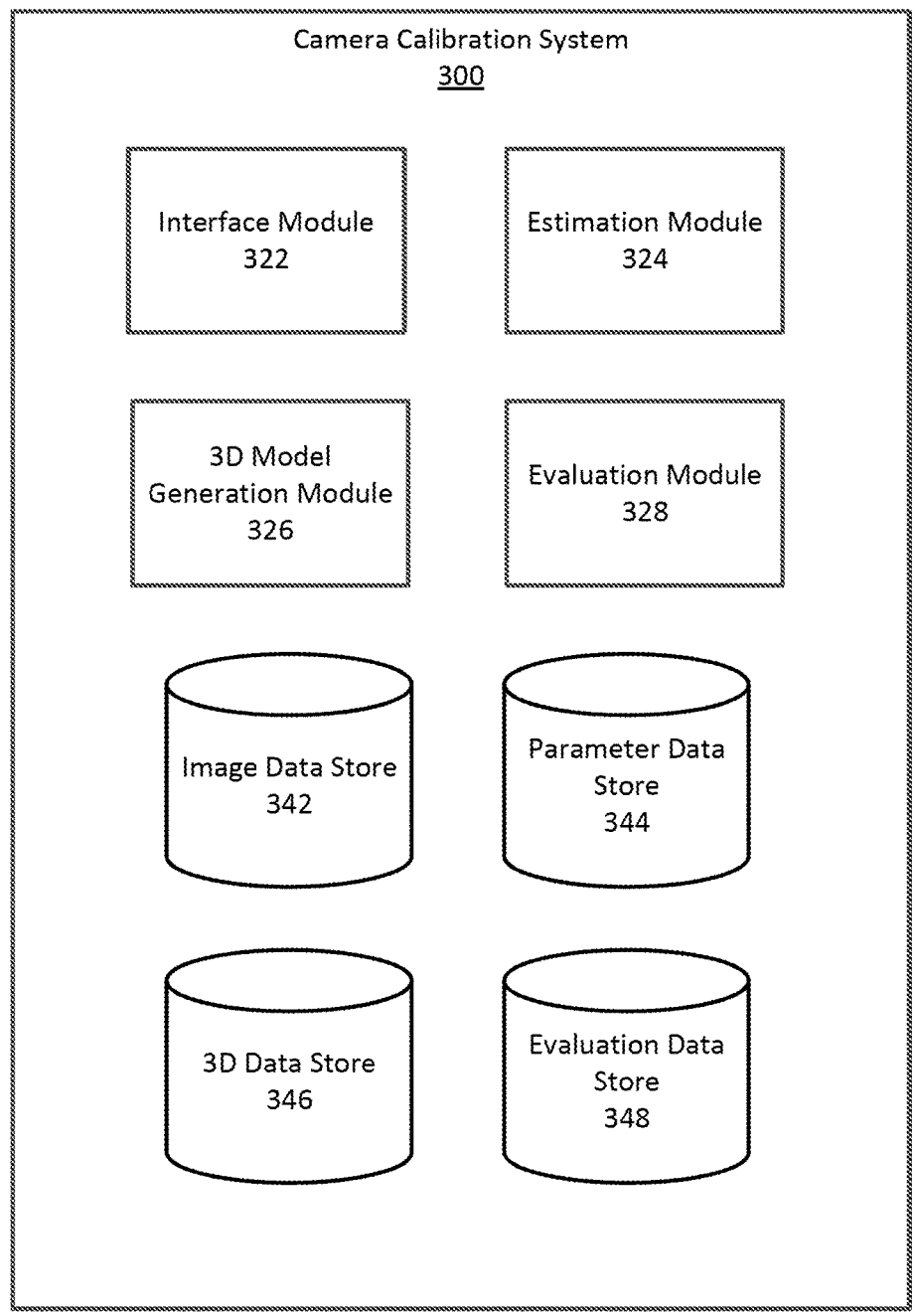
FIG. 3 is a block diagram of an architecture of the camera calibration system, according to one embodiment.

FIG. 3 is an example block diagram of an architecture of the camera calibration system 300, according to one embodiment. The camera calibration system 300 receives input from the camera rig system 200, such as images and/or videos captured by the multiple cameras in the camera rig system. For example, the camera calibration system 300 receives images of a test object captured by the camera rig system 200. The camera calibration system 300 also estimates and identifies calibration parameters such as rotation and translation for extrinsic calibration of the camera rig system 200, and generates a 3D model of the test object with calculated calibration measures such as location, size, texture and shape of the test object. The camera calibration system 300 evaluates the generated 3D model in comparison with the actual known test object in terms of the various calibration measures and adjusts the calibration parameters of the cameras based on the comparison.

In more detail, in FIG. 3, the camera calibration system 300 includes an interface module 322, an estimation module 324, a 3D model generation module 326, an evaluation module 328, an image data store 342, a parameter data store 344, a 3D data store 346 and an evaluation data store 348. In alternative embodiments not shown, additional and/or different components may be included in the camera calibration system 300. Likewise, the functions performed by various entities of the camera calibration system 300 may differ in different embodiments.

The interface module 322 receives input data from the camera rig system 200 and/or from the client VR device 180. More specifically, the interface module 322 receives images and/or videos from the camera rig system 200. For example, the interface module 322 can receive 2D images of a local area or an object (e.g., a test object) captured by the multiple cameras in the camera rig system 200. The interface module 322 may also receive image data and/or video data related to the images captured by the camera rig system 200. In one embodiment, the interface module 322 may also receive information about the test object for future calculation, as more fully described below. Example information about the test object includes location, size, shape, color and texture, and information about features on the test object, such as visual features of visually distinguished points on the object.

The interface module 322 may also receive configuration information about the camera rig system 200 for identification and estimation of the position and orientation of each camera included in the camera rig system. The configuration information describes the original or expected configuration of the cameras, such as their relationship to one another. The configuration information may also include a maximum error or calibration for the cameras and reflect manufacturing tolerances of the cameras. For example, the configuration information may indicate that each camera should be horizontally even with one another but may vary vertically by ±2 cm and angularly separated by 45 degrees ±2. The configuration information thus may be a starting point for the calibration of the cameras, and indicate maximum calibration parameters for the cameras in given directions. Initial calibration parameters may be determined based on the configuration information.

In one embodiment, the information about the test object and/or the configuration information about camera rig system 200 may be received from a user of the camera calibration system 300. For example, a user types the information into the camera calibration system 300 via the interface module 322. The user information may reflect, for example, measurements of the constructed camera rig system 200. In another embodiment, the information is received from another computer server (not shown here) related to the camera calibration system 300. The received images and/or related image data are stored in the image data store 342 for future use. The received information about the test object (e.g., location, size, texture, shape) and configuration information of cameras in the camera rig system 200, such as position and orientation information of each camera are stored in the parameter data store 344 for future use.

The interface module 322 may also receive input data from the client VR device 180. For example, the interface module 322 receives feedback information about views, images and/or data provided to a user who wears the client VR device 180 and provides output data, for example, modified or updated images to the user in response to the feedback.

The interface module 322 also outputs data to the camera rig system 200 and/or the client VR device 180, as described above. The output data to the client VR device 180 may include images and/or videos. For example, the interface module 322 may provide a user wearing the client VR device 180 with a generated 3D scene for virtual experience. The output data to the camera rig system 200 may be a request for more images about the test object or about a different local area, or updated calibration parameters of the camera rig system.

The estimation module 324 identifies and estimates parameters for extrinsic calibration for the camera rig system 200. In some embodiments, the parameters are calibration parameters used for calibrating the multiple cameras in the camera rig system 200. More specifically, each peripheral camera 230 has calibration parameters that indicate the relationship between the peripheral camera and other peripheral cameras in terms of position and orientation. The parameters also indicate, for each peripheral camera 230, the relationship between its actual position and orientation in the camera rig system 200 and the designed-for position and orientation (e.g., those specified in the configuration information). For example, a peripheral camera 230 may not be positioned in the place or oriented in the direction as is required by the design for that peripheral camera, which causes the images taken by the peripheral camera to be rotated or distorted. As one example, images captured by different peripheral cameras 230 may cause double vision when applied together to generate images for the client VR device 180.

For each peripheral camera 230, calibration parameters may include a rotation matrix and a translation matrix, which are well-established data structures for calibration for a multi-camera system. In more detail, the rotation matrix may describe the pitch, roll, and yaw of a camera and the translation matrix describes forward, lateral, and vertical placement of the camera. In some embodiments, the parameters for each peripheral camera 230 in the context of the camera rig system 200 are estimated based on configuration information about the peripheral cameras 230 that is stored in the parameter data store 344.

Parameters for a different number of cameras included in the camera rig system 200 may be identified and estimated at one time for one extrinsic calibration. For example, calibration parameters (e.g., rotation and translation) for two peripheral cameras 230 in the camera rig system 200 may be estimated at one time regardless of other cameras in the camera rig system, as more fully described below in FIG. 7, which corresponds to an extrinsic calibration for the two peripheral cameras. In this example, the two peripheral cameras 230 may be adjacent to each other or may be positioned in different places instead of being adjacent to each other. The two peripheral cameras 230 share overlapped viewing areas or field of views that include the same object to be captured by both cameras. Additionally, multiple rounds of extrinsic calibration can be executed to calibrate all the peripheral cameras 230 in the camera rig system 200 if only two cameras are jointly calibrated for one round. For example, the cameras may be iteratively calibrated. In each iteration, each pair of cameras sharing a field of view may be calibrated. In the example of FIG. 2C, a first iteration may calibrate cameras 295A and 295B using object 275B, then cameras 295B and 295C using object 275C, and so forth around the camera rig, until cameras 295H and 295A are calibrated using object 275A. The amount of change in the calibration parameters may be measured as a calibration error, and additional iterations of calibration may be performed until the calibration error is below a threshold or no longer improves.

As another example, a different number of peripheral cameras 230, for example, all the peripheral cameras in the camera rig system 200, may be jointly calibrated for one iteration. The calibration parameters are also stored in the parameter data store 344 for future use and may also be stored to the camera rig system 200 as well.

The 3D model generation module 326 receives images and/or image data of a local area or an object to generate a 3D model of the local area or the object. The 3D model of a local scene or an object is a 3D model simulating the local scene or the object, as more fully described below. As one example, the 3D model generation module 326 generates a 3D model for the test object based on the 2D images captured by the multiple cameras in the camera rig system 200. In more detail, the 3D model generation module 326 extracts images and/or image data of the test object from the image data store 342 and extracts current calibration parameters (e.g., rotation and translation) of the camera rig system 200 from the parameter data store 344. The 3D model of the test object is created based on the received 2D images of the test object and on the estimated calibration parameters of the multiple cameras camera rig system 200. The data about the generated 3D model includes information about location, size, shape and texture of the test object, for example, detailed information for visually distinguishable points on the 3D model. The data is also regarded as calibration measures, as described above. The data is stored in the 3D data store 346, as more fully described below.

The evaluation module 328 evaluates the generated 3D model to further adjust and re-estimate the calibration parameters to minimize error between the calibration measures of the known object and the 3D model. The evaluation module 328 extracts data about the generated 3D model from the 3D data store 346 and extracts known data about the test object from the parameter data store 344. The evaluation module 328 compares calibration measures of the 3D model against the known measures of the test object to generate a calibration error. These measures may include location, size, shape, texture and other measures as further discussed with respect to FIG. 6. The evaluation module 328 compares data about the generated 3D model and known data about the actual test object to evaluate how well the generated 3D model resembles the actual test object, for example, how well the generated 3D model matches the actual test object in the various measures. The difference between the known object and the 3D model (as determined by the measures) is termed as the calibration error.

A generated 3D model that well resembles or well matches the actual test object indicates that the calibration parameters (e.g., rotation and translation) for the multiple cameras, is close to correct and effectively represents the known object.

In contrast, a generated 3D model that does not resemble the actual test object indicates the calibration parameters (e.g., rotation and translation) of the camera rig system 200 is not accurate, and the extrinsic calibration for the multiple cameras involved is not effective. For example, the shape of the created 3D model may not be the same as the actual test object, or a texture determined for the 3D model may not be the same as the corresponding parts of the actual test object. These examples show that the estimation of calibration parameters (e.g., rotation and translation) may not be accurate. In some embodiments, a threshold value may be set for the calibration error. For example, the calibration error that falls within the threshold value may indicate a good match between the generated 3D model and the actual test object, and the calibration error that falls out of the threshold value may indicate a bad match between the generated 3D model and the actual test object.

As described above, the evaluation module 328 also evaluates the estimated calibration parameters of the camera rig system 200 based on the evaluation of the generated 3D model of the test object. In some embodiments, the calibration parameters (e.g., rotation and translation) is adjusted for a next round of calibration and 3D model generation based on the evaluation of the current estimation. For example, when the evaluation for the current round of calibration parameters of the multiple cameras has a high calibration error, which further indicates the current calibration is not very effective. In this example, the calibration parameters for the same multiple cameras involved may be adjusted for the next round of calibration, and during the next round of calibration, a new 3D model for the same test object is generated based on the same 2D images captured by the multiple cameras during the current round.

In one embodiment, the calibration parameters are adjusted using a gradient descent function or a gradient descent algorithm. The gradient descent function may determine how adjustments to the calibration parameters adjust the measures of the 3D model, and adjust the calibration parameters to minimize the difference between the measures of the 3D model and the known measures of the object. The gradient descent function may recalculate the 3D model based on the possible change to the calibration parameters, or determine how the measures would calibration error would change for various adjustments to the calibration parameters. The evaluation results for the generated 3D model and updated calibration parameters are stored in the evaluation data store 348.

The image data store 342 stores 2D images and/or image data of specific objects or scenes. As one example, the images may show multiple views of a same test object and are captured by different cameras in the camera rig system 200 from different perspective views. The image data may include information about each pixel on the 2D images, such as intensity, gradient and color for each pixel. The images and image data stored in the image data store 322 is used for the 3D model generation module 326 to generate 3D models of a test object, as described above.

The parameter data store 344 stores known data about test objects. For example, the parameter data store 344 stores size, shape, texture and other measures for a test object, and may include granular information about each point or a pattern on the test object.

The parameter data store 344 also stores configuration information and calibration parameters of multiple cameras that are to be jointly calibrated in the camera rig system 200.

The 3D data store 346 stores generated 3D models and data related to the generated 3D models. As described above, a 3D model is a 3D image of a local scene or object. As one example, 3D model of a test object is generated with 2D images of the test object stored in the image data store 342. The data related to a generated 3D model may include data such as size, shape and location of a test object in the scene captured by the multiple cameras involved.

The evaluation data store 348 stores evaluation data of generated 3D models and of the calibration parameters. The evaluation data of a generated 3D model of a test object may indicate the calibration error reflecting how well the 3D model resembles the actual test object, as described above.

Figure 4:
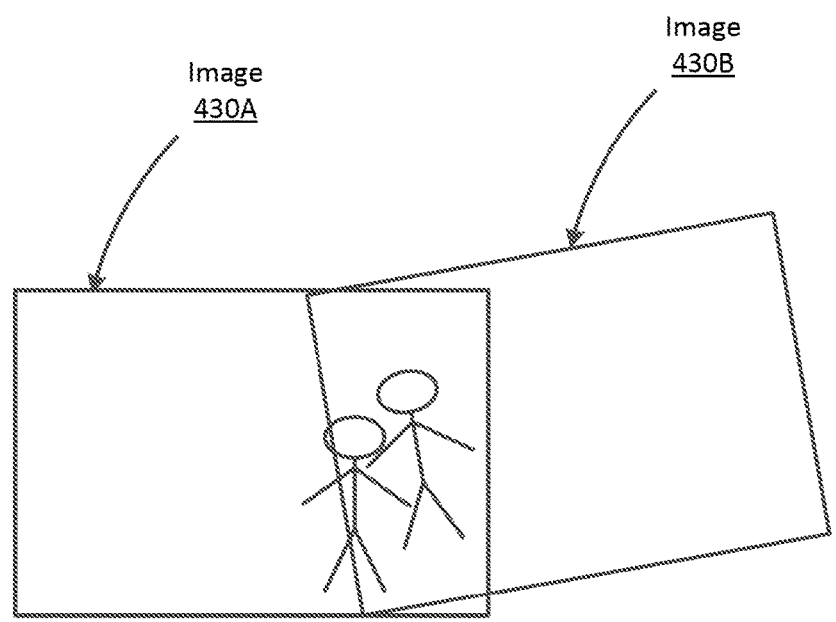
FIG. 4 shows example images from two cameras that have not been calibrated well, according to one embodiment.

FIG. 4 shows example images 430 from two cameras that have not been calibrated well, according to one embodiment. In FIG. 4, image 430A and image 430B are captured by two different peripheral cameras 230A and 230B to show a same object from two different perspective views. The two cameras 230A and 230B are not positioned or oriented as designed and are not jointly calibrated. As shown in FIG. 4, when blending the two images 430A and 430B to create a view for a user of the client VR device 180, it may cause double vision due to the inaccurate position and orientation of the two cameras 230A and 230B.

FIG. 5 shows an example test object 500 for extrinsic calibration of multiple cameras in the camera rig system 200, according to one embodiment. In FIG. 5, the test object 500 is a six-faced cube with a checkerboard pattern 510 applied on the front face. In the example shown in FIG. 5, the checkerboard pattern 510 is a 5 by 5 square checkerboard pattern. The corners of the checkerboard pattern 510 are used for future evaluation of the generated 3D models. In alternative embodiments not shown, the test object 500 may have a different type or shape instead of being a cube shown in FIG. 5.

FIG. 6A and FIG. 6B show two images 600 and 650 of the test object 500 captured by two different peripheral cameras 230 in the camera rig system 200, according to one embodiment. As shown in FIG. 6A and FIG. 6B, the corner 512 represents the same corner on the surface of the test object 500 shown in FIG. 5.

In the example of test object 500 shown in FIG. 5 and FIGS. 6A-6B, there are several ways to measure whether the generated 3D model resembles the actual test object. These measures may be computed and compared to determine the calibration error for the calibration parameters of the cameras that capture FIGS. 6A-6B. As one example, for the test object 500 shown in FIG. 5, each two faces of the cube should be perpendicular, in which case each two faces of the generated 3D model of the test object can be examined that whether they are perpendicular to each other. Mathematical calculations like dot product can be used for checking whether the faces of the generated 3D model are perpendicular to each other. As another example, each face of the test object 500 should be flat, in which case the generated 3D model can be examined to check whether each face of it is flat. As a further example, different sides of the test object 500 should not rotate with respect to each other. In another example, a face of an object in the generated 3D model may be compared against a corresponding point on the surface of the actual test object to evaluate how well the generated 3D model matches the actual test object. Stated another way, the texture on the face of the generated 3D model can be compared with the known pattern on the test object. In this example, the "checkerboard" pattern may be compared and one measure determines whether the pattern on the 3D model is a square pattern, or is warped. Each of these various aspects of the test object may be used as calibration measures for evaluating whether the generated 3D model is consistent with the known test object.

Figure 7:
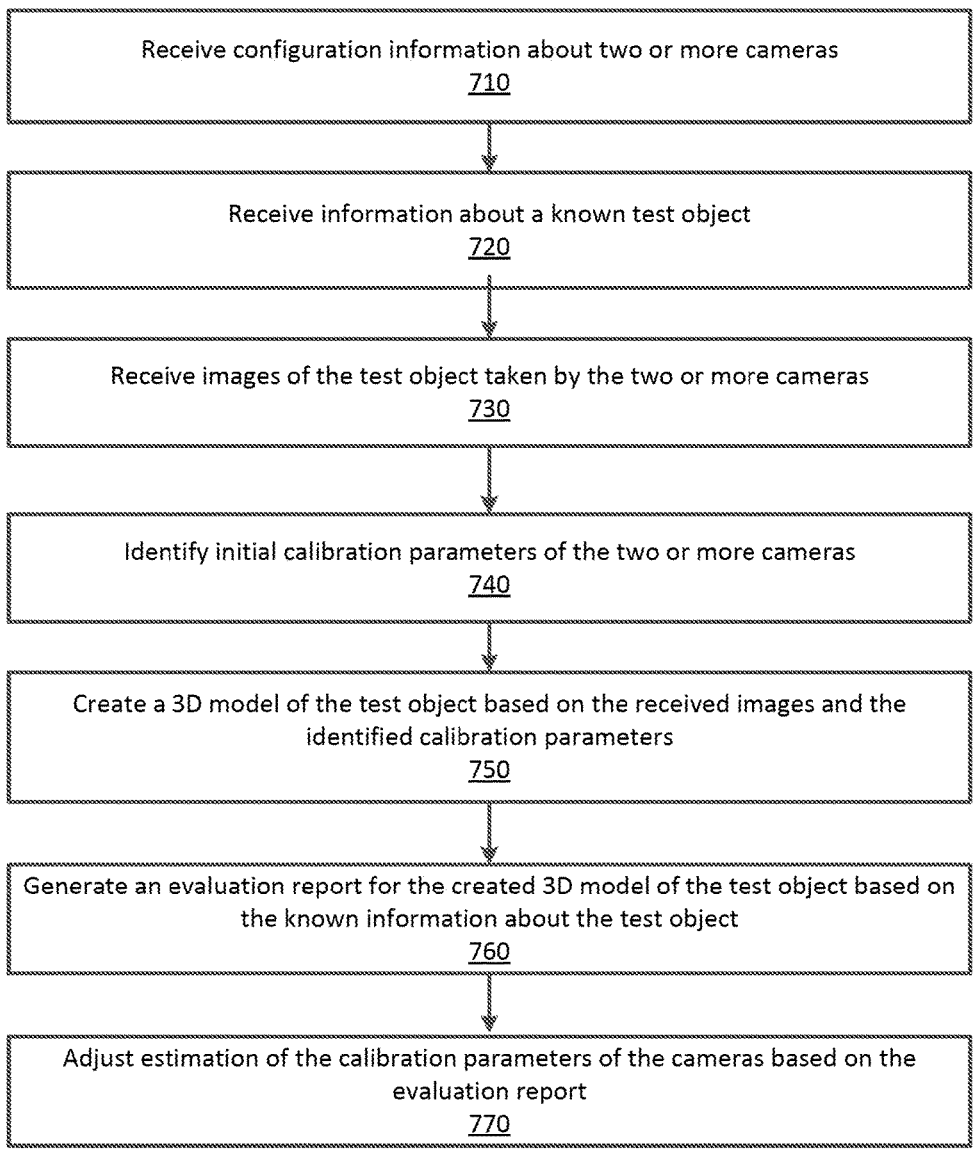
FIG. 7 shows an example flowchart illustrating a process of calibration via the camera calibration system, according to one embodiment.

FIG. 7 shows an example flowchart 700 illustrating a process of calibration via the camera calibration system 300, according to one embodiment. In the example flowchart shown in FIG. 7, two or more cameras in the camera calibration system 300 are jointly calibrated with parameters for these two or more cameras being jointly estimated. In alternative embodiments not shown, a different number of cameras or all the cameras in the camera calibration system 300 may be jointly calibrated using a process similar to the flow chart 700 shown in FIG. 7. As noted above, the calibration may be iterative, and in the first round of calibration to calibrate the two or more cameras with respect to a test object, then in a next round of calibration to calibrate another set of camera(s) using the calibration parameters adjusted from the first round of calibration.

Returning to FIG. 7, initially, the camera calibration system 300 receives 710 configuration information about two or more cameras in the camera rig system 200 for calibration. The configuration information may include information about the designed or measured relative position and orientation of each camera compared with the other camera(s) in the camera rig system 200. The camera calibration system 300 also receives 720 information about a known test object. The information may include various calibration measures of the known test object. The camera calibration system also receives 730 2D images of the known test object captured by the two or more cameras. The camera calibration system 300 identifies 740 or estimates initial calibration parameters of the cameras, for example, rotation and translation information of the cameras based on the received configuration information about the two or more cameras, or based on prior calibration parameters for the cameras. The camera calibration system 300 then creates 750 a 3D model of the test object based on the received 2D images of the test object and the identified calibration parameters of the two or more cameras. The camera calibration system 300 generates 760 an evaluation report for the created 3D model of the test object based on the known measures of the test object. The evaluation report may indicate how well the created 3D model resembles the actual test object and how well the parameters (rotation and translation) are estimated. The camera calibration system 300 adjusts 770 the estimation of the calibration parameters based on the evaluation report.

Additional Configuration Information

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for calibrating a camera rig system, the method comprising:
    receiving configuration information about a plurality of cameras in the camera rig system, the plurality of cameras sharing an overlapped part in their respective fields of view in which a test object is located; and
    for each adjacent pair of cameras of the plurality of cameras:
        identifying calibration parameters for the pair of cameras;
        receiving a plurality of images of the test object captured by the pair of cameras, the test object having known calibration measures;
        creating a 3D model of the test object based on the identified calibration parameters and the received plurality of images;
        calculating a calibration error that reflects differences between calibration measures of the created 3D model of the test object and the known calibration measures of the test object; and
        modifying the calibration parameters for the pair of cameras to reduce the calibration error.

2. The method of claim 1, wherein the configuration information includes, for each camera among the plurality of cameras, position and orientation relative to the other cameras among the plurality of cameras.

3. The method of claim 1, wherein the calibration measures of the test object include at least one of the following: location, size, texture, shape and detailed information of visually distinguishable points on the test object.

4. The method of claim 1, wherein the calibration parameters include rotation and translation information for each camera of the pair of cameras.

5. The method of claim 1, wherein the camera rig system includes a plurality of cameras and a plurality of known objects, wherein each known object is viewed by at least two cameras and each camera views at least two known objects.

6. The method of claim 1, further comprising performing additional iterations of calibration until the calibration error is below a calibration error threshold.

7. The method of claim 1, wherein the camera rig system includes a plurality of peripheral cameras, at least one top axis camera, and at least one bottom axis camera.

8. The method of claim 7, wherein the at least one top axis camera and at least one bottom axis camera are vertically offset relative to the plurality of peripheral cameras to limit overlap between fields of view.

9. A non-transitory computer-readable storage medium storing computer program instructions for calibrating a camera rig system, the computer program instructions when executed by a computer processor causes the processor to perform steps of:
    receiving configuration information about a plurality of cameras in the camera rig system, the plurality of cameras sharing an overlapped part in their respective fields of view in which a test object is located; and
    for each adjacent pair of cameras of the plurality of cameras:
        identifying calibration parameters for the pair of cameras;
        receiving a plurality of images of the test object captured by the pair of cameras, the test object having known calibration measures;
        creating a 3D model of the test object based on the identified calibration parameters and the received plurality of images;
        calculating a calibration error that reflects differences between calibration measures of the created 3D model of the test object and the known calibration measures of the test object; and
        modifying the calibration parameters for the pair of cameras to reduce the calibration error.

10. The non-transitory computer-readable storage medium of claim 9, wherein the configuration information includes, for each camera among the plurality of cameras, position and orientation relative to the other cameras among the plurality of cameras.

11. The non-transitory computer-readable storage medium of claim 9, wherein the calibration measures of the test object include at least one of the following: location, size, texture, shape and detailed information of visually distinguishable points on the test object.

12. The non-transitory computer-readable storage medium of claim 9, wherein the calibration parameters include rotation and translation information for each camera of the pair of cameras.

13. The non-transitory computer-readable storage medium of claim 9, wherein the camera rig system includes a plurality of cameras and a plurality of known objects, wherein each known object is viewed by at least two cameras and each camera views at least two known objects.

14. The non-transitory computer-readable storage medium of claim 9, further comprising performing additional iterations of calibration until the calibration error is below a calibration error threshold.

15. The non-transitory computer-readable storage medium of claim 9, wherein the camera rig system includes a plurality of peripheral cameras, at least one top axis camera, and at least one bottom axis camera.

16. The non-transitory computer-readable storage medium of claim 15, wherein the at least one top axis camera and at least one bottom axis camera are vertically offset relative to the plurality of peripheral cameras to limit overlap between fields of view.

* * * * *